(12) United States Patent
Yuan et al.

(10) Patent No.: US 9,912,847 B1
(45) Date of Patent: Mar. 6, 2018

(54) IMAGE CAPTURE GUIDANCE TO REDUCE SPECULAR REFLECTION EFFECTS

(71) Applicant: Amazon Technologies, Inc., Reno, NV (US)

(72) Inventors: Chang Yuan, Seattle, WA (US); Leo B. Baldwin, San Jose, CA (US); Geoffrey Scott Heller, Seattle, WA (US); Daniel Bibireata, Seattle, WA (US); Louis L. LeGrand, III, Seattle, WA (US); Christopher S. A. MacGregor, Seattle, WA (US); Charles P. Vaughn, Seattle, WA (US); Francislav P. Penov, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 341 days.

(21) Appl. No.: 13/626,596

(22) Filed: Sep. 25, 2012

(51) Int. Cl.
*H04N 13/02* (2006.01)
*H04N 5/225* (2006.01)

(52) U.S. Cl.
CPC ............ *H04N 5/225* (2013.01); *H04N 13/02* (2013.01)

(58) Field of Classification Search
CPC ... G01N 21/57; G02B 21/367; G03B 21/2046
See application file for complete search history.

(56) References Cited

U.S. PATENT DOCUMENTS

| 4,863,268 A * | 9/1989 | Clarke | G01F 1/661 348/128 |
|---|---|---|---|
| 4,920,385 A * | 4/1990 | Clarke | G01N 21/88 356/237.2 |
| 5,801,773 A | 9/1998 | Ikeda | |
| 6,032,070 A * | 2/2000 | Flock | A61B 5/0059 600/310 |
| 6,181,379 B1 * | 1/2001 | Kingetsu | H04N 1/00286 348/205 |

(Continued)

OTHER PUBLICATIONS

"Creating Still Photography by Extracting Frames from HD Video" by Michael Zhang, Published by PetaPixel, available at http://petapixel.com/2012/05/16/creating-still-photographs-by-extracting-frames-from-hd-video/.*

(Continued)

*Primary Examiner* — Jay Patel
*Assistant Examiner* — Shadan E Haghani
(74) *Attorney, Agent, or Firm* — Polsinelli LLP

(57) ABSTRACT

A user can capture an image of an object, using a computing device, to obtain information about that object. If a specular highlight (or other saturated region) is detected, the device can attempt to determine a location of a light source associated with the highlight. The device can then provide instructions as to a direction to move in order to reduce the presence of the specular highlight in subsequent images. Multiple images of the object can be captured and analyzed to generate a three-dimensional reconstruction of the environment, whereby a position of the light source can be determined. In other embodiments, movement of the specular reflections in response to movement of the device is used to determine a direction of the light source. In other embodiments, an image of the user is captured to determine the position of the light source based on shadows or reflections on the user.

24 Claims, 10 Drawing Sheets

(56) References Cited

U.S. PATENT DOCUMENTS

| | | | |
|---|---|---|---|
| 7,612,804 B1 | 11/2009 | Marcu et al. | |
| 8,072,503 B2 | 12/2011 | Tischer | |
| 9,619,722 B2* | 4/2017 | Takeda | G06K 9/00845 |
| 2002/0097896 A1* | 7/2002 | Kuckendahl | 382/124 |
| 2002/0113882 A1 | 8/2002 | Pollard et al. | |
| 2002/0171824 A1* | 11/2002 | Overbeck | G01J 3/508 |
| | | | 356/138 |
| 2003/0083850 A1* | 5/2003 | Schmidt et al. | 702/189 |
| 2003/0096302 A1 | 5/2003 | Yguerabide et al. | |
| 2003/0152252 A1* | 8/2003 | Kondo | G07C 9/00158 |
| | | | 382/117 |
| 2005/0117118 A1* | 6/2005 | Miller | A61B 3/13 |
| | | | 351/246 |
| 2005/0141076 A1* | 6/2005 | Bausenwein | G02B 26/0833 |
| | | | 359/291 |
| 2005/0154381 A1* | 7/2005 | Altshuler | A61B 18/203 |
| | | | 606/9 |
| 2006/0017692 A1* | 1/2006 | Wehrenberg et al. | 345/156 |
| 2006/0018539 A1* | 1/2006 | Sato | G06K 9/36 |
| | | | 382/173 |
| 2006/0181543 A1* | 8/2006 | Katsumata | G01J 3/28 |
| | | | 345/589 |
| 2007/0024975 A1* | 2/2007 | McGrew | G02B 5/1828 |
| | | | 359/489.06 |
| 2007/0076016 A1* | 4/2007 | Agarwala et al. | 345/629 |
| 2007/0132759 A1* | 6/2007 | Mallick | G06T 5/30 |
| | | | 345/426 |
| 2008/0057479 A1* | 3/2008 | Grenness | A61C 13/0004 |
| | | | 433/223 |
| 2008/0165266 A1 | 7/2008 | Jenkins | |
| 2008/0267530 A1 | 10/2008 | Lim | |
| 2009/0001175 A1* | 1/2009 | Goren | G06K 7/10732 |
| | | | 235/462.42 |
| 2009/0181394 A1 | 7/2009 | Chung | |
| 2010/0279876 A1 | 11/2010 | Albertson et al. | |
| 2011/0222793 A1 | 9/2011 | Ueda et al. | |
| 2011/0227922 A1* | 9/2011 | Shim | G06T 15/50 |
| | | | 345/426 |
| 2011/0298942 A1 | 12/2011 | Uchida et al. | |
| 2012/0007996 A1 | 1/2012 | Bilcu | |
| 2012/0026290 A1 | 2/2012 | Lim et al. | |
| 2012/0154619 A1* | 6/2012 | Lee | G06K 9/228 |
| | | | 348/222.1 |
| 2012/0162454 A1 | 6/2012 | Park et al. | |
| 2012/0218437 A1* | 8/2012 | Hermary | G01B 11/245 |
| | | | 348/222.1 |
| 2012/0218444 A1* | 8/2012 | Stach | G06T 1/0021 |
| | | | 348/241 |
| 2012/0257079 A1 | 10/2012 | Ninan et al. | |
| 2013/0083204 A1 | 4/2013 | Solhusvik et al. | |
| 2013/0088569 A1* | 4/2013 | Fredericks | H04N 13/00 |
| | | | 348/43 |
| 2013/0121569 A1 | 5/2013 | Yadav | |
| 2013/0157282 A1 | 6/2013 | Bouzid et al. | |
| 2013/0307922 A1 | 11/2013 | Chou et al. | |
| 2016/0042240 A1* | 2/2016 | Takeda | G06K 9/00597 |
| | | | 382/104 |
| 2016/0119612 A1* | 4/2016 | Wu | G06T 7/80 |
| | | | 348/48 |

OTHER PUBLICATIONS

Yang, Qingxiong et al., "Real-time Specular Highlight Removal Using Bilateral Filtering", http://vision.ai.uiuc.edu/~qyang6/, 2010, 14 pages.

Filip Sroubek, et al., "Superfast Superresolution," 18th IEEE International Conference on Image Processing, 2011, 4 pages.

Grossberg, Michael D., et al., "What is the Space of Camera Response Functions?" Proceedings of the 2003 IEEE Computer Society Conference on Computer Vision and Pattern Recognition (CVPR '03), 8 pages.

Park, Sung C. et al., "Super-Resolution Image Reconstruction: A Technical Overview," IEEE Signal Processing Magazine, May 2003, 16 pages.

Szeliski, Richard, "Computer Vision: Algorithms and Applications," Sep. 3, 2010 draft, 88 pages, Springer Science & Business Media 2010.

Tsai, Roger Y., "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-344.

Vora, Poorvi L., et al., "Linear Models for Digital Cameras," Proceedings, IS&T's 50$^{th}$ Annual Conference, 1997, 6 pages.

Yang, Qingxiong, et al., "Real-time Specular Highlight Removal Using Bilateral Filtering," 2010, 14 pages, http://vision.ai.uiuc.edu/~qyang6/.

Zhang, Zhengyou, "A Flexible New Technique for Camera Calibration," last updated Dec. 5, 2009, 22 pages, zhang@microsoft.com.

* cited by examiner

IMAGE CAPTURE GUIDANCE TO REDUCE SPECULAR REFLECTION EFFECTS

BACKGROUND

Users are increasingly utilizing electronic devices to obtain various types of information and perform various tasks. For example, a user wanting to obtain information about a book can capture an image of the cover of the book and upload that image to a book identification service for analysis. A problem with capturing images of objects such as books, however, is that items of this type often have a glossy cover that is substantially planar in shape, and as such can predominantly reflect light from a light source in a single direction. If that direction happens to fall within a field of view of a camera capturing an image of that book, at least a portion of the image can be saturated due to the specular reflection of the incoming light from that light source, which is predominantly directed toward the camera in such a configuration. Accordingly, at least a portion of the information about the book will be lost in the image, as the area corresponding to the specular reflection or specular highlight can saturate the camera sensor pixels at that location. If the saturated area covers enough of the cover, or obscures enough of the unique features of the cover in the image, an image matching process might not be able to find a matching image or identify the object represented in the image.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to obtaining information about an object in an electronic environment. In particular, various embodiments enable info, illation to be obtained for an object by capturing one or more images each including a view of that object, and then providing image data from the one or more images to an image matching algorithm or other such process for identifying the object from the image data. In at least some embodiments, the computing device can detect a specular reflection, amount of saturation, or region where the detected light exceeds a maximum intensity threshold, for at least a portion of a camera or sensor of the computing device. In response, the computing device can attempt to determine a location or direction of a light source associated with the specular reflection. Once the location or direction is determined, the computing device can attempt to determine a direction or location to which the user should move or adjust the computing device in order to reduce, minimize, or remove the effects of the specular reflection such that a subsequently captured image will be more likely to produce accurate results when provided to an appropriate algorithm, process, or service. The location or direction of the light source can be calculated or estimated using one or more images, which in some embodiments can include images captured at different locations capable of being utilized to provide three-dimensional location information. The three-dimensional location information can be used to determine information such as the position and orientation of the object, as well as the change in position of the specular highlight between image capture positions, which can provide for more accurate light source location determinations. In some embodiments, a camera facing the user can also capture a view on the "front" (user-side) of the device. The view from the front side can be analyzed to attempt to determine the location of shadows, bright spots, or other such aspects on the user to further assist in determining the location of one or more light sources.

Various other functions and advantages are described and suggested below as may be provided in accordance with the various embodiments.

Figure 1:
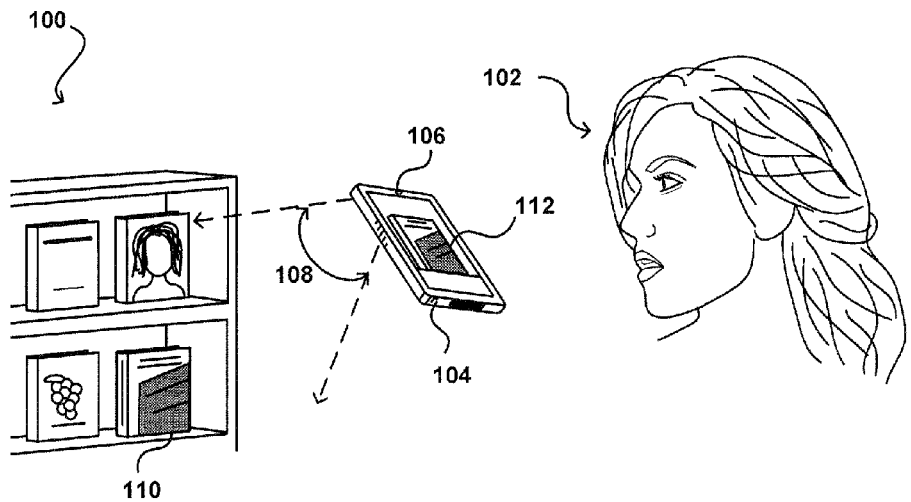
FIG. 1 illustrates an example environment in which aspects of the various embodiments can be utilized.

FIG. 1 illustrates an example environment 100 in which aspects of the various embodiments can be implemented. In this example, a user 102 is in a location that has a collection of books, and the user is interested in obtaining information about a particular book 110. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, and portable media players, among others.

In this example, a camera 106 on the device 104 can capture image information including the book 110 of interest, and at least a portion of the image can be displayed on a display screen 112 of the computing device. At least a portion of the image information can be analyzed and, upon a match being located, identifying information can be displayed back to the user via the display screen 112 of the computing device 104. The portion of the image to be analyzed can be indicated manually, such as by a user pointing to the book on the screen or drawing a bounding box around the book. In other embodiments, one or more image analysis algorithms can attempt to automatically locate one or more objects in an image. In some embodiments, a user can manually cause image information to be analyzed, while in other embodiments the image information can be analyzed automatically, either on the device or by transferring image data to a remote system or service as discussed later herein.

Figure 2:
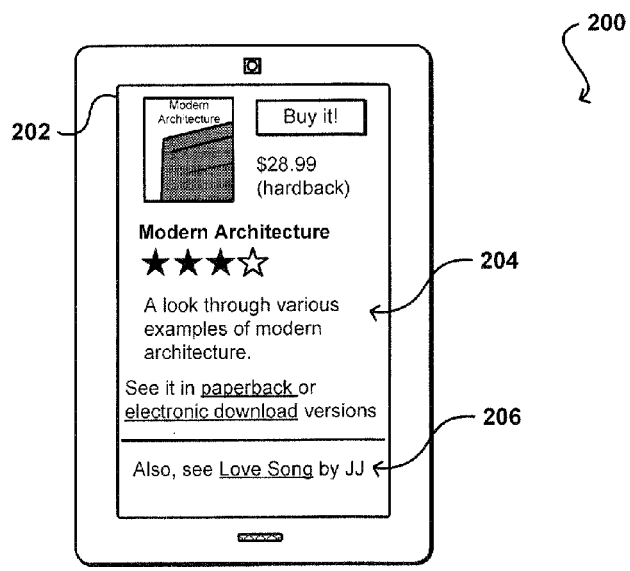
FIG. 2 illustrates example display that can be presented in accordance with various embodiments.

FIG. 2 illustrates an example of a type of information 204 that could be displayed to the user via a display screen 202 of a computing device 200 in accordance with various embodiments. In this example, the image captured by the user has been analyzed and related information 204 is displayed on the screen. The "related" information as discussed elsewhere herein can include any information related to an object, item, product, or other element that is matched (within at least a level of confidence) to the image data using one or more matching or identifying algorithms, or other such approaches. These can include, for example, image recognition algorithms, object identification algorithms, facial recognition algorithms, barcode detection algorithms, optical character recognition algorithms, or any other such approaches or techniques. The displayed information in this example includes the title of the located book, an image of the book (as captured by the user or otherwise obtained), pricing and description information, and review information. Also as shown are options to purchase the book, as well as options for various other versions or forms of that content, such as a paperback book or digital download. The type of information displayed (or otherwise conveyed) can depend at least in part upon the type of content located or matched. For example, a located book might include author and title information, as well as formats in which the book is available. For facial recognition, the information might include name, title, and contact information. Various other types of information can be displayed as well within the scope of the various embodiments.

When capturing images, it is typical that there will be one or more light sources that provide the majority of the light illuminating an object of interest. If outside, this can be the sun, while if inside this can be one or more overhead lamps, lights, or other such sources. Further, in some situations a flash or other illumination element of a camera can provide a source of illumination. As discussed, if the object being imaged is at least somewhat glossy, that object can reflect a significant portion of that light along one or more angles, depending upon factors such as the shape of the object and the relative position of each nearby light source. If the direction in which light from a light source is reflected happens to coincide with at least a portion of a camera sensor, at least a portion of the sensor might be saturated by the light such that any information about the object at that location is lost. Even in situations where the sensor is not saturated, the amount of light reflected can dominate that portion of the sensor such that it is difficult to extract any useful information about the object. In some situations, the specularly reflected light can so bias the exposure such that non-highlighted areas (i.e., the shadow areas) are underexposed and difficult to analyze with respect to the low ratio of signal to noise in the shadow areas.

Figure 3:
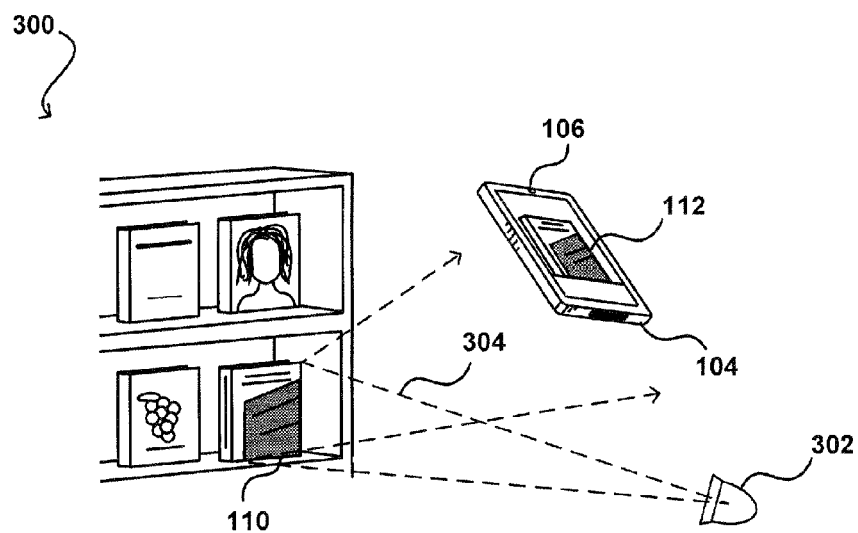
FIG. 3 illustrates an example environment in which aspects of the various embodiments can be utilized.
Figure 4:
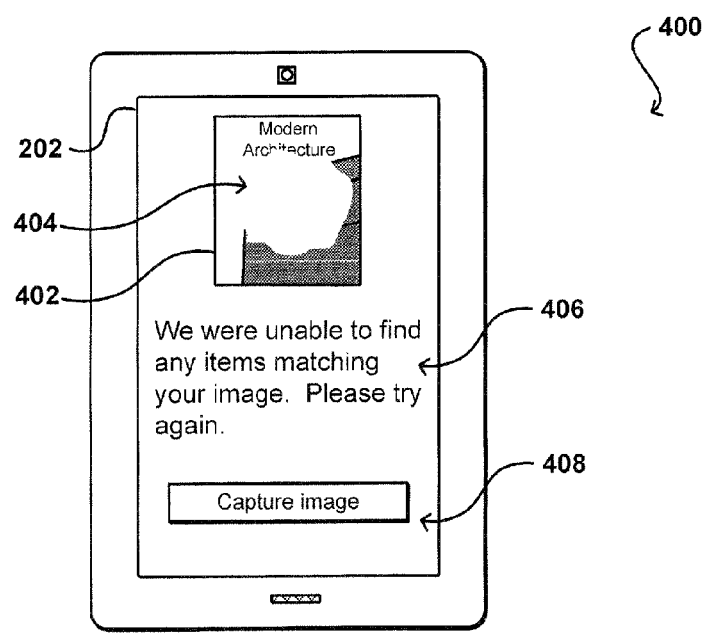
FIG. 4 illustrates an example interface state that can be presented on a computing device in accordance with various embodiments.

For example, FIG. 3 illustrates a similar layout 300 to that illustrated in FIG. 1, except that in this layout there is a directional light source 302 that directs light toward the cover of the book 110, which is then reflected towards the camera 106 of the computing device 104. It is to be understood that reference numbers are carried over between figures for similar elements, but such use is for purposes of ease of explanation and not intended to be a limitation on the scope of the various embodiments unless otherwise stated. If the book is a hardback book with a glossy cover, or a paperback book with a glossy finish on the cover, for example, the book can act like a mirror and cause a specular reflection of the light from the light source 302, which can cause the camera to capture an image as if the light source was pointing directly at the camera sensor. For example, the situation 400 in FIG. 4 illustrates an example of an image 402 that could be captured of the book illustrated in FIG. 3. In this example it is illustrated that the captured image includes a large, over-saturated white region 404 in the middle of the book, which corresponds to the portion of the camera sensor that was saturated by secularly reflected light from the light source. In this example the reflection or "specular highlight" has prevented a number of features of the book cover from being determinable from the image, which can prevent an image matching algorithm or similar process from successfully matching the image and/or identifying the object represented in the image. As illustrated in this example, the interface 406 displayed on the display screen 202 of the client device displays a notification to the user that the object in the image could not be identified, and requests that the user capture another image and repeat the identification process, as may utilize a specified interface object 408 or other such element. Such an approach can be frustrating and time consuming for the user. Further, such additional processing can utilize an additional amount of battery power, which can be limited on a portable computing device, and can utilize a significant additional amount of bandwidth if the image is transferred for processing.

Accordingly, approaches in accordance with various embodiments attempt to guide the user to move the camera to a location, or at least in a direction, whereby the effects of the specular reflection will be reduced, minimized, or even prevented for subsequent images. Software executing on (or remote from) a computing device can analyze information captured by one or more cameras of the device in order to attempt to determine the relative location and/or direction of at least one light source associated with a specular reflection. Upon determining the location and/or direction of the light source, as well as information such as the location, orientation, and/or shape of an object being imaged, for example, the software can attempt to determine a direction or location to which the user can move the camera in order to cause the specular reflection to have less impact on an image captured of the object. These instructions can be provided to a user and, in at least some embodiments, the user can be notified when the camera is in a location, or an image has been captured, where the intensity of detected light is within an acceptable amount or threshold, etc. In one embodiment the instructions can be graphical elements on the screen such as arrows indicating the direction to move the device and/or textual instructions. In other embodiments the instructions may be spoken through a speaker on the device. In another embodiment, the device vibrates with haptic feedback, with the vibration increasing as the appropriate new vantage-point is reached. In another embodiment the vibration starts at a high value and diminishes in intensity as a new acceptable vantage point is reached. These cues to the user can be used individually or in combination.

Figure 5A:
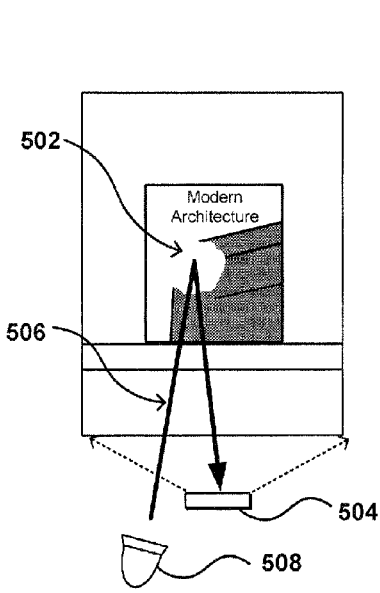
FIGS. 5(a), 5(b), 5(c), 5(d), and 5(e) illustrate example configurations that can be used to determine a direction or a location of a light source in accordance with various embodiments.

FIG. 5(a) illustrates an example of an image 500 that can be captured of an object, in this case a book, using a camera 504 of a computing device. In this example, the image 500 includes a saturation region 502, or specular highlight, that hides or prevents determination of a number of features or correspondence points of the book in the image. As discussed, such an image might not be able to be successfully processed using an object recognition or image matching algorithm, for example, as there might not be enough unique features in the image of the book to successfully identify or match the book. In at least some embodiments, software executing on (or remote from) the device can attempt to estimate a direction of a light source 508 with respect to the object and/or the computing device, in order to determine a direction in which the device should be moved to capture an image without the specular reflection, or at least with less saturation with respect to the portion of the image corresponding to the object.

In this example, the software can determine that the specular reflection 502 is located towards the left side of the book in the image. If the book has a flat cover that is approximately parallel to the plane of the camera sensor, as would be the typical orientation, the device can determine that the light source 506 is likely to the left of the camera, and in some cases can use the amount that the specular reflection 502 is offset from the center of the field of view of the camera to estimate the direction of the light source based on the estimated reflection path 506 from the light source to the camera sensor. Using such a basic estimation, the device might determine that the user should move to the right in order to most quickly cause the specular reflection to no longer occur on the book in captured images.

Figure 5B:
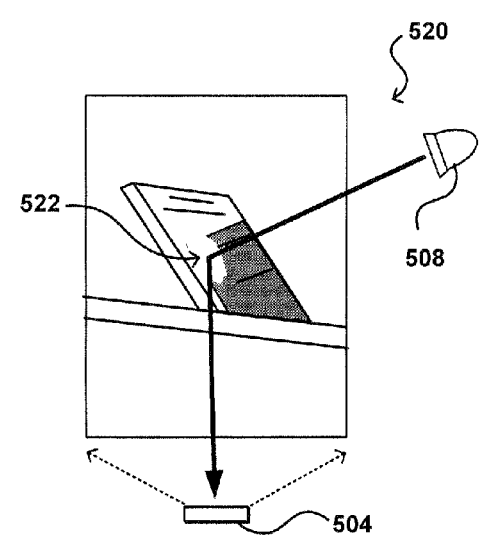

A potential problem with such an approach, however, is that from a single image it can be difficult to determine information such as the orientation of the object, distance to the object, and other such information, which can affect the accuracy of the light direction determination, as well as the calculation of the direction in which the device should be moved. For example, FIG. 5(b) illustrates an example image 520 that could be captured of a book in a different orientation. While a book has a fairly common shape and the orientation could be narrowed to two possible orientations based on the image, such determination requires that the device be able to determine the type of object, and that the type of object has a known shape. For irregularly shaped objects, or objects that have not yet been able to be identified, such information may not be available. In the image 520 the specular reflection 522 is again towards the left side of the book. Using just this information from a single image, however, could cause the device to estimate that the light source is to the left, when in fact in this example the light source 508 is to the right of the camera. The orientation of the book 522 with respect to the light source causes the specular reflection to appear towards the left side of the book in the image. If the device indicated to the user that the user should move to the right based on the determination, the resulting image might actually include more saturation or at least the same amount of specular reflection, but in a different location that could be more toward the center of the book in the image, which might actually be worse from an analysis standpoint. In many cases it can be adequate to obtain one or more additional images from a sufficiently different angle, wherein the specific direction of the different angle does not make a substantial difference.

Figure 5C:
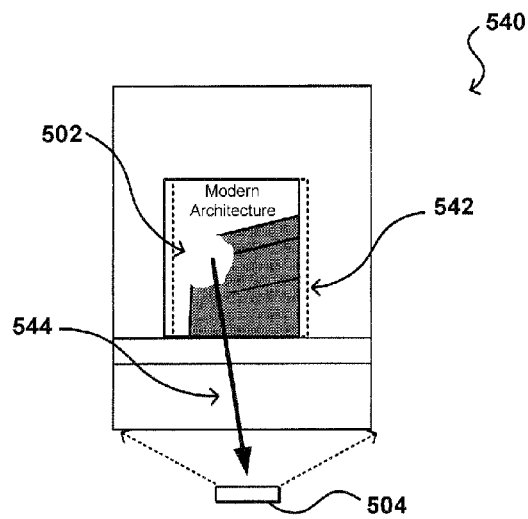

Accordingly, approaches in accordance with various embodiments can attempt to capture at least one additional image, such as the example image 540 illustrated in FIG. 5(c), in order to attempt to obtain three-dimensional information about the surrounding environment, which can be used to model the environment and determine, with more accuracy, the direction of one or more light sources causing specular reflection. In this image it can be seen that the position of the book has changed with respect to the position in the image 500 of FIG. 5(a). The amount of movement, or disparity, can be used to calculate the distance to the book, as long as the distance between the camera(s) capturing the two images is also known, as is known for stereoscopic imaging. Further, stereo imaging data can be used to determine a shape and/or orientation of the book based at least in part upon the disparity information for different regions or locations of the book. As illustrated, the position of the specular reflection 502 has shifted to the left as well, such that the path 544 of the reflection to the camera changes by a determinable amount. By determining the approximate location and orientation of the book, as well as the amount that the position of the specular reflection changes between images and/or the path of the reflection changes between images, an approximate location of the light source can be determined.

Figure 5D:
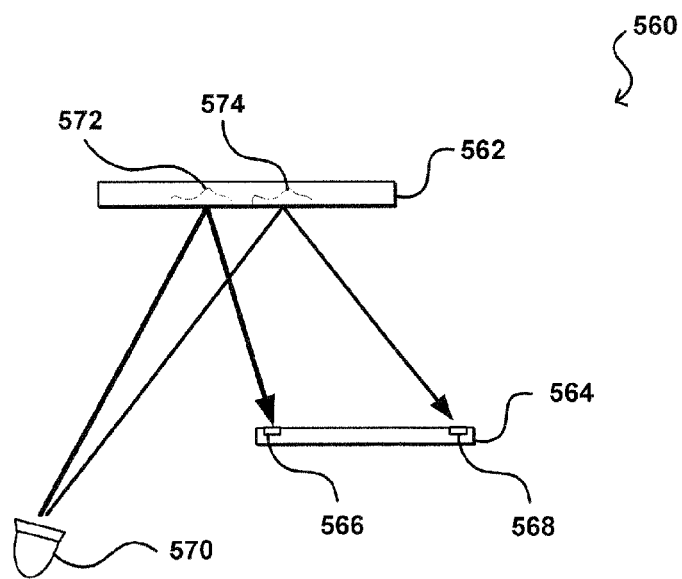

FIG. 5(d) illustrates an example configuration 560 wherein a computing device 564 includes a pair of cameras 566, 568 capable of being used for stereoscopic imaging, or at least capable of concurrently capturing images that are able to be analyzed to obtain three-dimensional information about at least one object in the surrounding environment. In this example, the computing device 564 has data specifying a distance between the two cameras. If each camera captures an image of the object 562, the amount of disparity between the locations of the object in the images, once registered, can be used to determine the distance to the object. Further, the location of the specular reflection in each image can be used to determine a direction in which the light is reflected from the object to the respective camera. By analyzing the distance to the object and the paths of reflection, the approximate location of the light source 570 can be determined, such as is shown by the vector representation in FIG. 5(d). Upon determining the position of the light source, the device can determine a direction in which the device should be moved to reduce intensity of light detected by the camera from the light source.

Figure 5E:
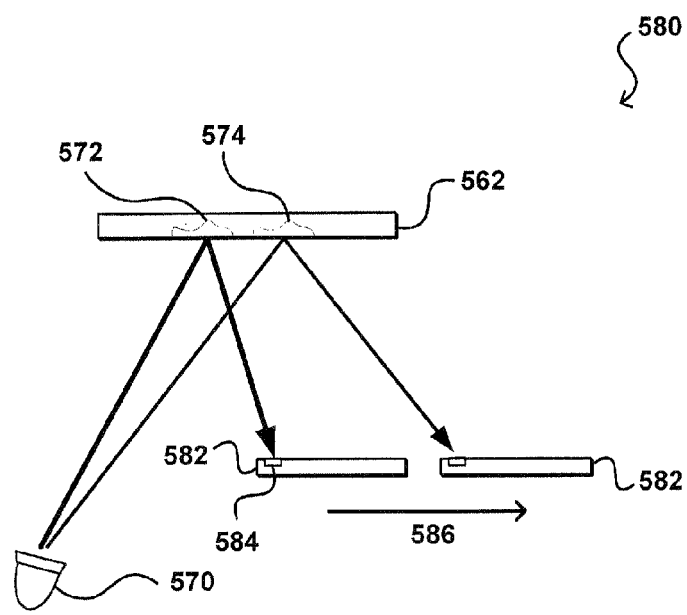

In many cases, however, a device might not have multiple cameras configured or positioned to capture such images concurrently. Accordingly, devices in accordance with various embodiments can attempt to capture images at different locations using the same camera in order to attempt to obtain disparity information useful in reconstructing an environment. For example, FIG. 5(e) illustrates an example situation 580 wherein a computing device 582 includes a single camera 584, at least at a location on the device where the object is within a field of view of the camera. The camera can capture an image of the object 562 and the specular reflection 572 in a first location from a first location of the computing device 582. The computing device might move over time, as the user might move with respect to the object or might move the device with respect to the object. A computing device can include one or more motion- and/or orientation-determining sensors that can detect motion of the device and provide data that can be used to determine an amount and/or direction in which the device moved. In this example, it can be determined that the device moved in a specific direction 586 by a specific amount. This movement can be determined using data from an accelerometer, inertial sensor, or other such sensor of the device. By determining the amount that the device moved, the device can treat a second image captured by the camera like an image captured by the second camera in FIG. 5(d), wherein the distance can be used with the disparity information for the object between the two images to determine a position of the object 562. As with the example above, the specular reflection 574 will appear at least somewhat shifted in the second image, barring movement of the object or another such change, and the different reflection paths can be used with the position information to determine the position of the light source 570 associated with the specular reflection.

In at least some embodiments, the device can capture a first image of the object and attempt to determine the direction of the light source using a single image. If the device detects motion using a device sensor (or changes of position in objects captured in a video feed, for example), the device can capture at least a second image at a second position in order to attempt to obtain information useful in making a more accurate determination in position of the light source. In other embodiments, an interface on the device might instruct the user to move or pan the device in order to be able to capture an image from at least one other location. Various other such approaches can be used as well within the scope of the various embodiments.

Figure 6:
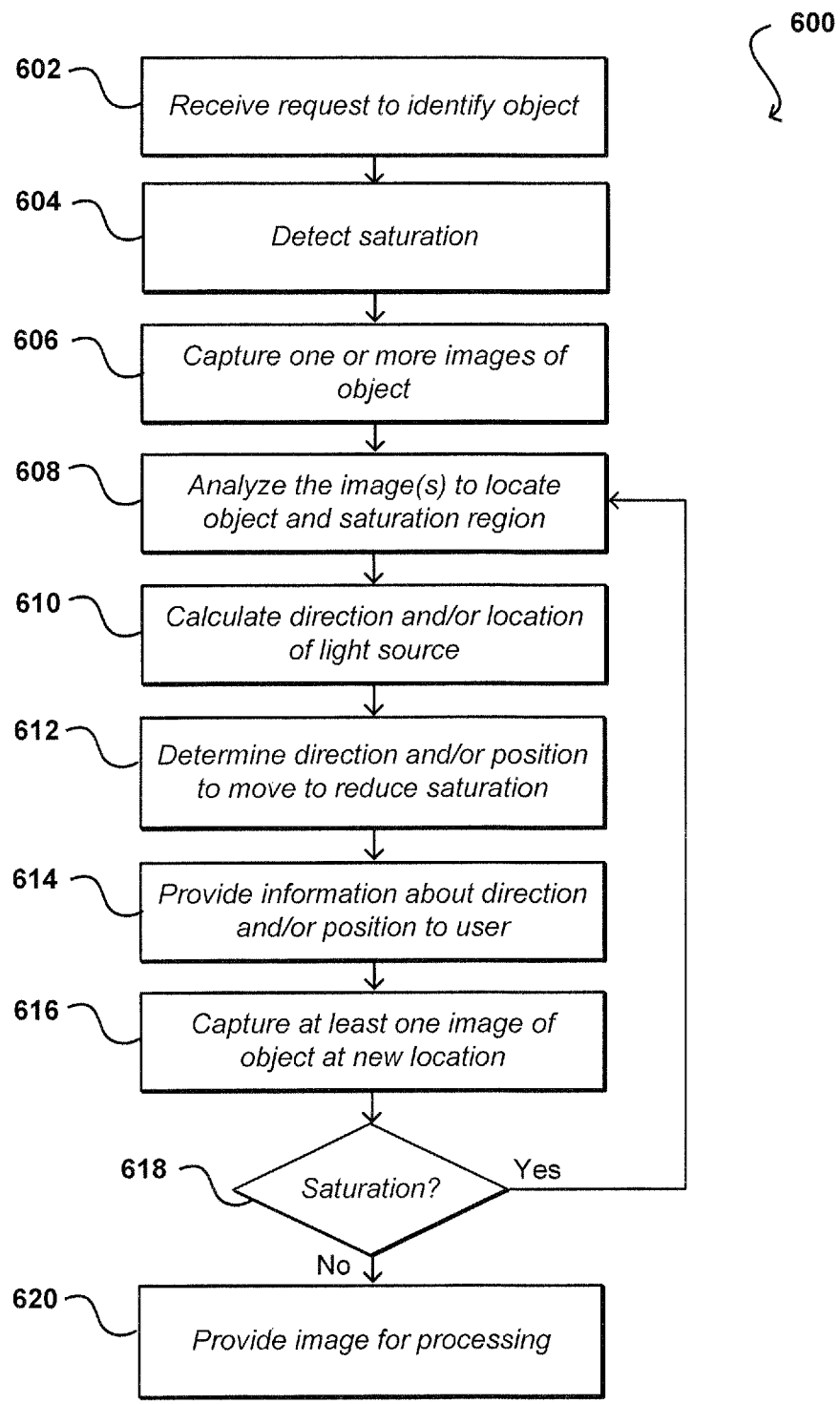
FIG. 6 illustrates an example process for guiding a user to capture an image of an object able to be identified in accordance with various embodiments.

FIG. 6 illustrates an example process 600 for identifying an object represented in an image that can be utilized in accordance with various embodiments. It should be understood that there can be additional, fewer, or alternative steps performed in similar or alternative orders, or in parallel, within the scope of the various embodiments unless otherwise stated. In this example, a request to identify an object is received 602 to a computing device. The request can be received from a user, an application, or another such source, locally or remote to the device. In this example, the computing device can detect 604 an amount of saturation, as may be determined using a light sensor, a preliminary image taken with a low resolution camera, or another such approach. One or more images (or frames of video) can be captured 606 using one or more cameras of the computing device, where at least one of the images includes a view of the object. In some embodiments, the first image is captured and analyzed to detect the saturation. The images can be analyzed 608 to locate the object and/or a region of saturation in each image. Based at least in part upon the location of the saturation region in the at least one image, a direction and/or position of the light source can be determined 610. In some embodiments, movement of the specular reflection with movement of the device can be analyzed to attempt to more accurately determine the direction and/or position of the light source. If multiple images are captured of the object, a registration process can be used to align corresponding portions of the images. In such a registration process, unique or identifying features are located in each image, and then an alignment, mapping, or other such process can be used to correlate those and other points or features in the images. Based at least in part upon the determined direction and/or location of the light source, a direction and/or position to which the device should be moved to reduce the saturation in can be determined 612, and information about the direction and/or position can be provided 614 to the user, such as by displaying text or an arrow on a display screen of the computing device. At least one image can then be captured 616 at the new location. The image can be analyzed to determine if an excessive amount of saturation 618 is still present. If an amount of saturation is present in the image that exceeds a saturation threshold, for example, the process of determining the direction of the light source and instructing the user as to a direction to move can continue. In some embodiments the motion sensors can be used to determine when the user has moved to a location where the amount of saturation from the light source might be acceptable, but there might be other light sources, the object might move, or there might be other factors that require additional images be analyzed to determine the position of a light source associated with a specular reflection. When an image is captured that does not have more than an acceptable amount of saturation or specular reflection present, the image can be provided 620 for processing. As discussed elsewhere herein, the image can be processed on and/or remote from the computing device to attempt to identify at least a type of the object, such that related information can be conveyed to a user or other such destination.

Approaches in accordance with other embodiments can take advantage of the fact that many portable devices that include at least one camera on a first side also include at least one camera on the opposite side. For example, a smart phone might have a first camera on a side of the device with a main display screen, which can capture images of a user for purposes such as video chat. The device might also have a high resolution camera on a side of the phone opposite the display screen in order to capture images of objects, where the display screen can be used as a view finder for the camera. These cameras can be caused to capture images concurrently in some embodiments, which then can be analyzed to attempt to determine the direction of a light source in accordance with various embodiments.

Figure 7A:
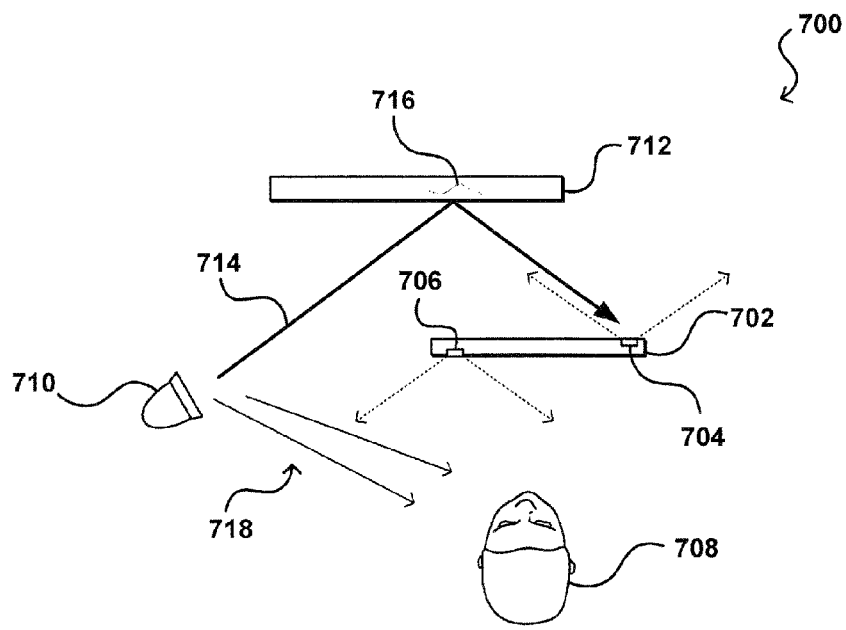
FIGS. 7(a), 7(b), and 7(c) illustrate an example approach to determining a direction of a light source using at least one image of a user in accordance with various embodiments.

FIG. 7(a) illustrates an example configuration 700 wherein a computing device 702 has a primary camera 704 on a first side of the device and a secondary camera 706 on the second side of the device, although the number and arrangement of cameras can vary by embodiment. In this example, the object 712 is within a field of view of the primary camera 704 and the user is within a field of view of the secondary camera 706. If an image of the object captured by the primary camera shows a specular reflection 716 or other saturation region, a second image captured by the secondary camera 706 can be analyzed to locate the user 708, or another such person or object, and attempt to determine lighting conditions with respect to the user. For example, a user might have shadows cast on portions of the user's face from a light source in a certain direction, or might have bright spots where lights reflect off the user's forehead, eyes, glasses, or other such features. The light source(s) might be directly observed in the vicinity of the user, appearing as very bright areas corresponding to the sun or a lamp or other light source. The lighting direction information from the user image can be combined with the information from the image of the object to attempt to determine a more accurate direction and/or location of a lighting source 710. In this example the camera can determine an approximate direction of the light source 710 based on a reflection path 714 determined by the location of the specular reflection 716. The shadows on the user's face indicate that the light is coming in from a certain range of directions 718, and the location of the shadows indicates that the light is at least partially in front of the user's face. By combining this information, the device can approximate the location of the light source, as illustrated in FIG. 7(a).

Figures 7B, 7C:
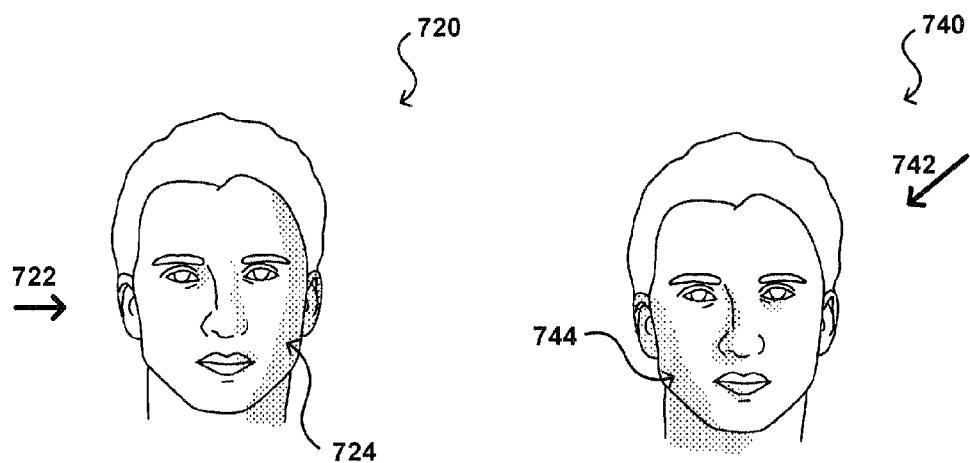

FIGS. 7(b) and 7(c) illustrate example views 720, 740 that can be captured of a user in accordance with various embodiments. As can be seen, the shadows in each view are in different locations on the user's face. By analyzing the locations of these shadows, a device can determine the approximate direction of light 722, 742 for each view, which can be combined with the information from one or more object images to determine the approximate direction and/or location of at least one light source. As discussed, once an approximate location of a light source is determined, the user can be given instructions as to a direction to move in order to improve the quality of a capture image and reduce the amount of specular reflection captured in the image.

Figure 8:
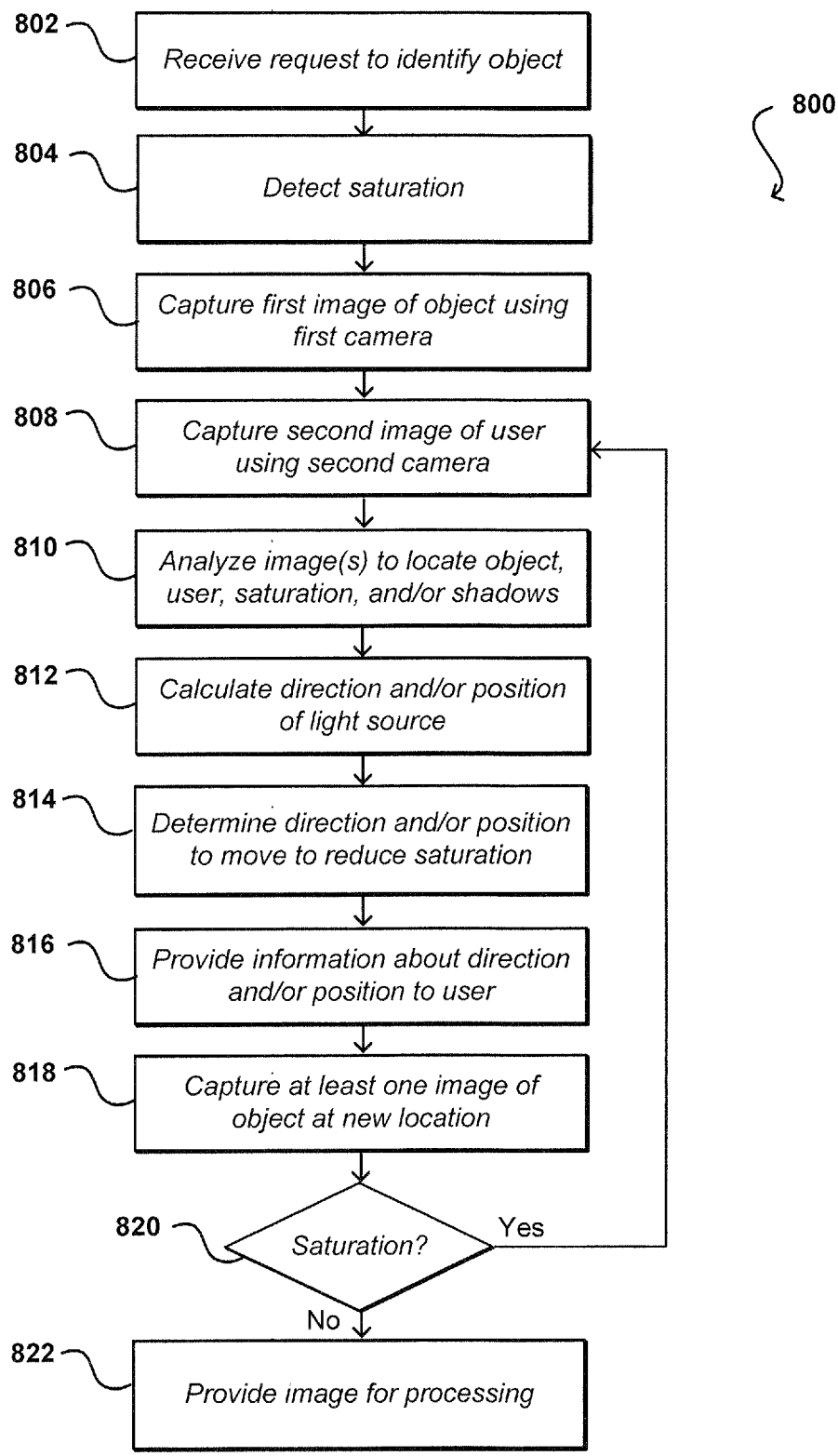
FIG. 8 illustrates an example process for guiding a user to capture an image of an object able to be identified in accordance with various embodiments.

FIG. 8 illustrates an example process 800 for identifying an object represented in an image that can be utilized in accordance with various embodiments. In this example, a request to identify an object is received 802 to a computing device. The computing device can detect 804 an amount of saturation, as may be determined using a light sensor, a preliminary image taken with a low resolution camera, or another such approach. A first image of the object can be captured 806 using a first camera of the computing device. In some embodiments, the first image is captured and analyzed to detect the saturation. A second image of a user of the computing device can be captured 808 using a second camera of the computing device. The images can be analyzed 810 to locate features such as the object, the location of the specular reflection, the user, and one or more shadow regions on the user. Based at least in part upon this information, a direction and/or position of the light source can be calculated 812. Based at least in part upon the determined direction and/or location of the light source, a direction and/or position to which the device should be moved to reduce the saturation in can be determined 814, and information about the direction and/or position can be provided 816 to the user, such as by displaying text or an arrow on a display screen of the computing device. At least one image can then be captured 818 at the new location. The image can be analyzed to determine if an excessive amount of saturation 820 is still present. If an amount of saturation is present in the image that exceeds a saturation threshold, for example, the process of determining the direction of the light source and instructing the user as to a direction to move can continue. When an image is captured that does not have more than an acceptable amount of saturation or specular reflection present, the image can be provided 822 for processing. As discussed elsewhere herein, the image can be processed on and/or remote from the computing device to attempt to identify at least a type of the object, such that related information can be conveyed to a user or other such destination.

In some embodiments, multiple front-facing cameras can be used that each capture the face (or a different portion) of the user at different angles. The three-dimensional information that can be obtained for the face from the multiple images, as well as the differences in the positions of the shadows and/or reflections in each image, can help to more accurately determine the location of a light source in at least some embodiments.

Figure 9:
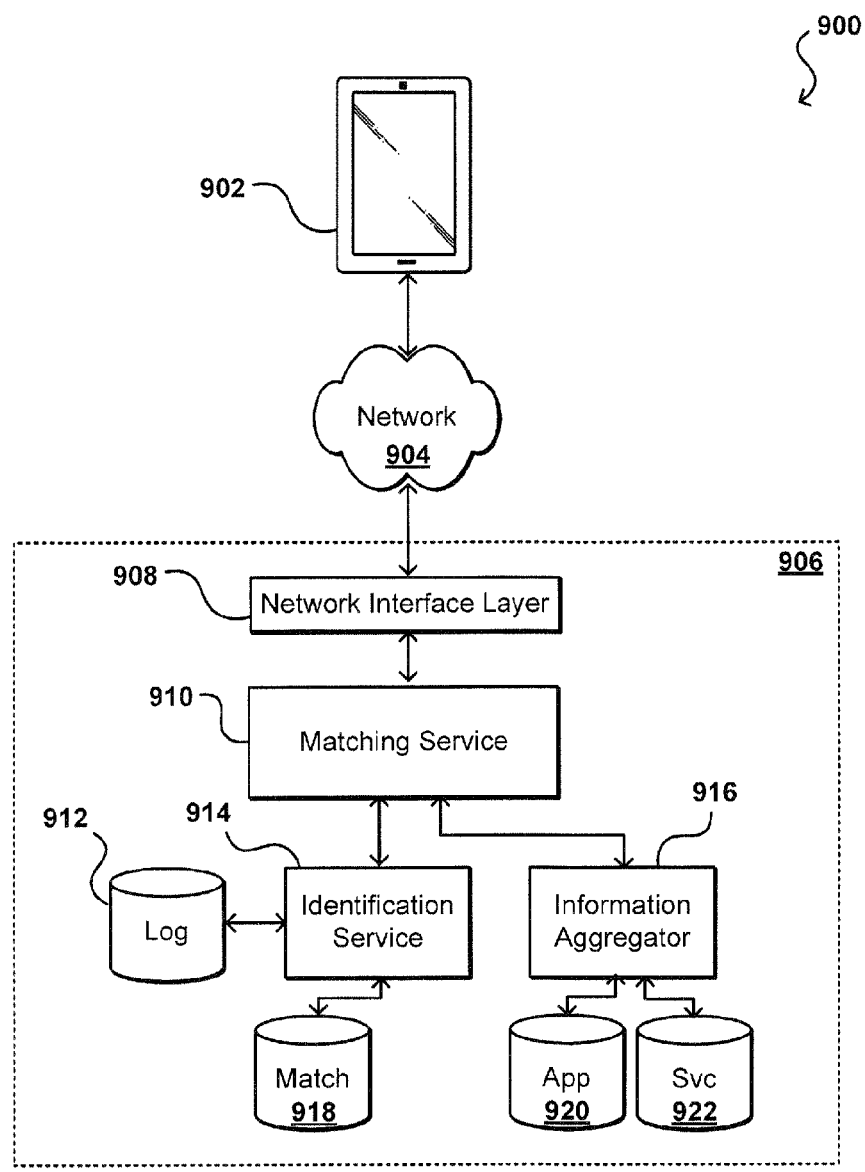
FIG. 9 illustrates an example system that can be used to implement aspects of the various embodiments.

FIG. 9 illustrates an example environment 900 in which aspects of the various embodiments can be implemented. In this example, a user is able to obtain or designate information about an object of interest using a computing device 902. For example, a user can cause the device to capture audio and/or video information including the object of interest, or can select the object of interest using an interface of the computing device, among other such options discussed and suggested herein. The device 902, automatically or in response to user input, can send information pertaining to the object across at least one appropriate network 904 to attempt to obtain actions, applications, services, or other items that can be used with the object of interest. The network 904 can be any appropriate network, such as may include the Internet, a local area network (LAN), a cellular network, and the like. In some embodiments, the device might analyze the information for the object to determine information such as a type of the object and/or actions that can be performed with that type of object, and might send information about the type of object and/or actions across the network in order to obtain information about applications or services, for example, that are not currently available on the computing device 902.

The request can be sent to an appropriate content provider 906, as may provide one or more services, systems, or applications for processing such requests. The information can be sent by streaming or otherwise transmitting data as soon as it is obtained by the device and/or ready for transmission, or can be sent in batches or through periodic communications. In this example, the request is received to a network interface layer 908 of the content provider 906. The network interface layer can include any appropriate components known or used to receive requests from across a network, such as may include one or more application programming interfaces (APIs) or other such interfaces for receiving such requests. The network interface layer 908 might be owned and operated by the provider, or leveraged by the provider as part of a shared resource or "cloud" offering. The network interface layer can receive and analyze the request, and cause at least a portion of the information in the request to be directed to an appropriate system or service, such as a matching service 910 as illustrated in FIG. 9. A matching service in this example includes components operable to receive data about an object, such as image or audio data, analyze the data, and return information relating to people, products, places, things, or other items that are determined to match objects in that data.

The matching service 910 in this example can cause information to be sent to at least one identification service 914, device, system, or module that is operable to analyze the data and attempt to locate one or more matches for objects reflected in the data. In at least some embodiments, an identification service 914 will process the received data, such as to extract points of interest or unique features in a captured image or audio portion, for example, then compare the processed data against data stored in a matching data store 918 or other such location. In other embodiments, unique feature points, image histograms, text, or other such information about an image can be generated on the device and uploaded to the matching service, such that the identification service can use the processed information to perform the match without a separate image analysis and feature extraction process. Certain embodiments can support both options, and combinations thereof, among others. The data in an object matching data store 918 might be indexed and/or processed to facilitate with matching, as is known for such purposes. For example, the data store might include a set of histograms or feature vectors instead of a copy of images or audio files to be used for matching, which can increase the speed and lower the processing requirements of the matching. Approaches for generating information to use for such matching are well known in the art and as such will not be discussed herein in detail.

The matching service 910 can receive information from each contacted identification service 914 as to whether one or more matches could be found with at least a threshold level of confidence, for example, and can receive any appropriate information for a located potential match. The information from each identification service can be analyzed and/or processed by one or more applications of the matching service 920, such as to determine data useful in obtaining information for each of the potential matches to provide to the user. For example, a matching service might receive bar codes, product identifiers, or any other types of data from the identification service(s), and might process that data to be provided to a service such as an information aggregator service 916 that is capable of locating applications, services, or other items that might be relevant to the identified object.

In at least some embodiments, an information aggregator 916 might be associated with an entity that provides an electronic marketplace, or otherwise provides applications or content for consumption (e.g., purchase, rent, lease, or download) by various customers. Although downloadable applications and electronic commerce are presented in this and other examples, it should be understood that these are merely examples and that approaches presented in the present disclosure can relate to any appropriate types of applications or services as discussed and suggested elsewhere herein. In such an instance, the information aggregator service 916 can utilize the aggregated data from the matching service 910 to attempt to locate applications, in an application data store 920 or other such location, which are offered through the marketplace and that are related to the object, or actions that can be taken with respect to the object. The information aggregator service 916 can also utilize the aggregated data to locate information for services, from a service data store 922 or other such location, which are offered through the marketplace and that are related to the object. Other types of information can be determined, as discussed elsewhere herein.

For example, if the identification service identifies the object to be a book that the user does not own, the information aggregator can utilize one or more suggestion algorithms or other such approaches to attempt to determine related applications or services for such a book. In some embodiments, the information aggregator might determine all the options to be displayed to a user, or only some of the options, with other options being determined by a similar component on the computing device. In embodiments where the information aggregator attempts to determine one or more applications that are not installed on the device, and/or one or more services that are related to the object, the information aggregator can select one or more top options based on any of a number of different criteria, and can provide information for these options to the device. Information for located applications and services can be stored in a log data store 912 or other such location, which can be used to assist in determining future potential matches or suggestions that might be of interest to various users. Various other types of information can be returned as well within the scope of the various embodiments.

It should be understood that, although the identification services are shown to be part of the provider environment 906 in FIG. 9, that one or more of these identification services might be operated by third parties that offer these services to the provider. For example, an electronic retailer might offer an application that can be installed on a computing device for identifying apps for purchase. When a user transfers information about an object, for example, the provider could forward this information to a third party who has software that specializes in identifying objects. The provider could then match the results from the third party with apps and services from the retailer's electronic catalog in order to return the intended results to the user. If the user selects an application to download and install on the device 902, the user can cause a request to be submitted to the content provider system 906 in order to have a copy of the app from the data store 920 transferred to the client device for installation. If the application or service is provided by a third party, the content provider can provide a link, address, or other information that the user can use to obtain the application or service.

Figure 10:
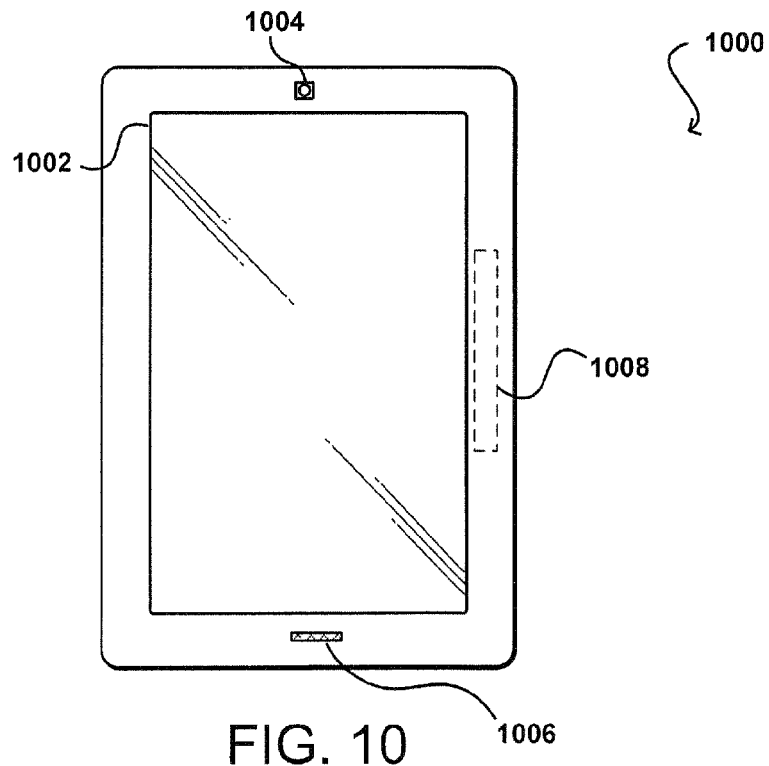
FIG. 10 illustrates an example device that can be used to implement aspects of the various embodiments.

FIG. 10 illustrates an example electronic user device 1000 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 1000 has a display screen 1002 on the front side, which under normal operation will display information to a user facing the display screen (e.g., on the same side of the computing device as the display screen). The computing device in this example includes at least one camera 1004 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish-eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 1000 also includes at least one microphone 1006 or other audio capture device capable of capturing audio data, such as words or commands spoken by a user of the device, music playing near the device, etc. In this example, a microphone 1006 is placed on the same side of the device as the display screen 1002, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 1000 also includes at least one orientation sensor 1008, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device. In some embodiments, a device can start analyzing image information when movement of the device is detected using one of these sensors. In other embodiments, a user can provide input to the device by tilting the device, shaking the device, or performing another such motion or action.

Figure 11:
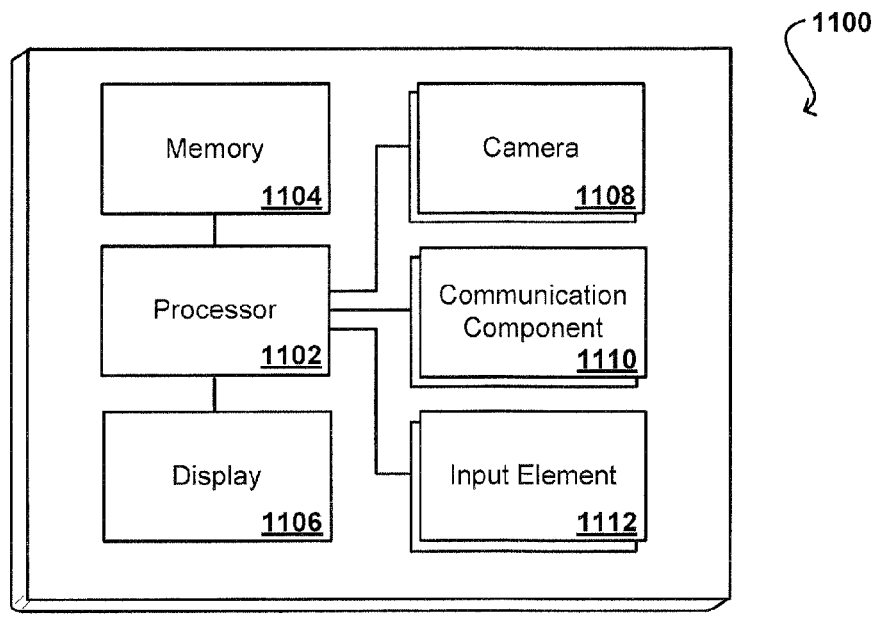
FIG. 11 illustrates example components of a client device such as that illustrated in FIG. 10.

FIG. 11 illustrates a logical arrangement of a set of general components of an example computing device 1100 such as the device 1000 described with respect to FIG. 10. In this example, the device includes a processor 1102 for executing instructions that can be stored in a memory device or element 1104. As would be apparent to one of ordinary skill in the art, the device can include many types of memory, data storage, or non-transitory computer-readable storage media, such as a first data storage for program instructions for execution by the processor 1102, a separate storage for images or data, a removable memory for sharing information with other devices, etc. The device typically will include some type of display element 1106, such as a touch screen or liquid crystal display (LCD), although devices such as portable media players might convey information via other means, such as through audio speakers. As discussed, the device in many embodiments will include at least one media capture element 1108 such as a camera or infrared sensor that is able to image projected images or other objects in the vicinity of the device, or an audio capture element able to capture sound near the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can include at least one mono or stereo microphone or microphone array, operable to capture audio information from at least one primary direction. A microphone can be a uni- or omni-directional microphone as known for such devices.

In some embodiments, the computing device 1100 of FIG. 11 can include one or more communication components 1110, such as a Wi-Fi, Bluetooth, RF, wired, or wireless communication system. The device in many embodiments can communicate with a network, such as the Internet, and may be able to communicate with other such devices. In some embodiments the device can include at least one additional input element 1112 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

Figure 12:
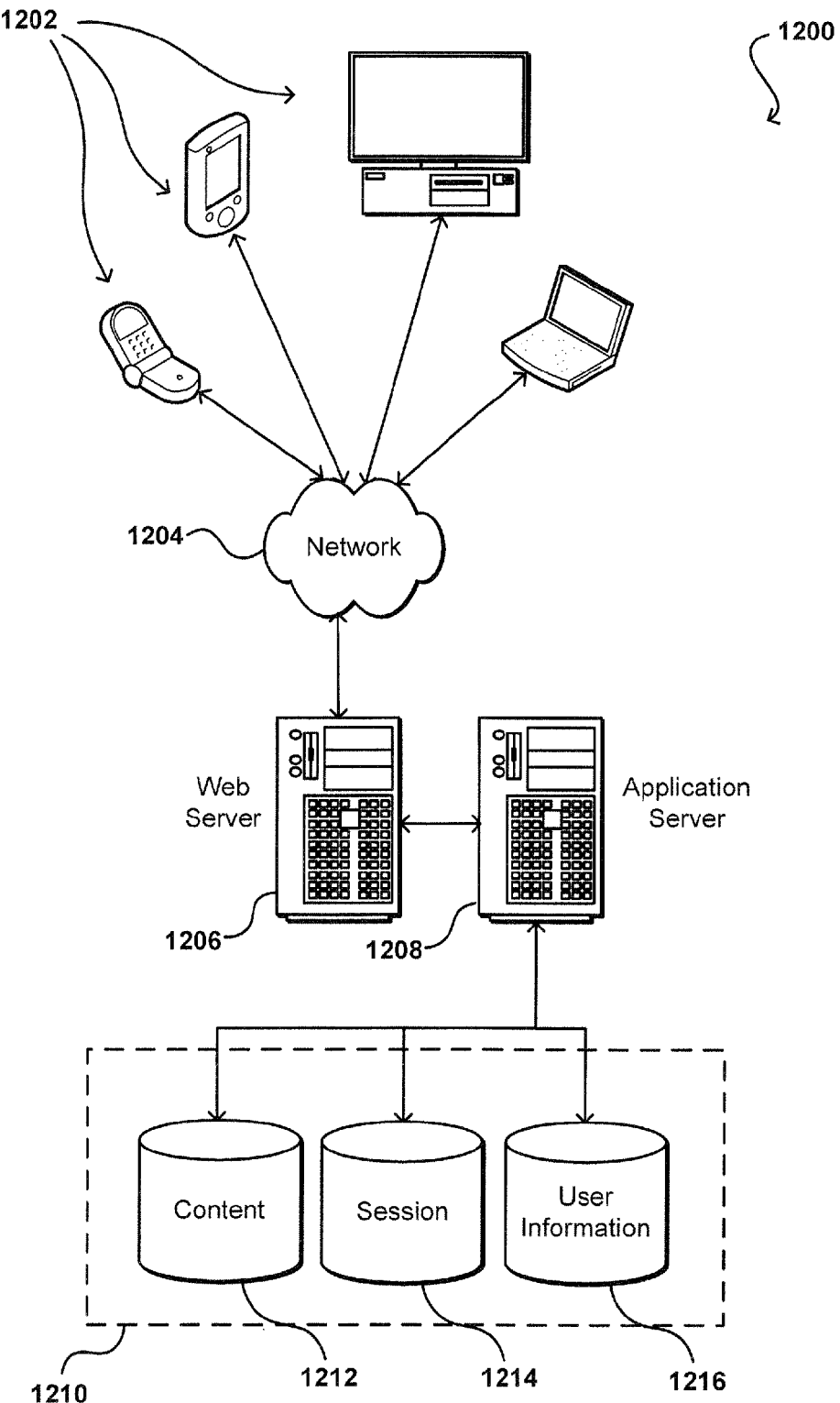
FIG. 12 illustrates an environment in which various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1202. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of identifying a planar object, comprising:
    detecting the planar object within a field of view of a first camera of a computing device;
    determining that an intensity of light, reflected by the planar object and incident on at least one image sensor region of the first camera, exceeds an intensity threshold;
    generating first image data of the planar object using the first camera of the computing device;
    generating second image data of a planar surface of the planar object using a second camera of the computing device, the first camera being separated from the second camera by a distance;
    registering, as a stereo image pair, the first image data and the second image data to substantially align a plurality of features in the first image data with a plurality of corresponding features in the second image data;
    determining an orientation of the planar object, based at least on the first image data and the second image data in the stereo image pair;
    determining a first location of a first region of the first image data where the determined intensity of light exceeds the intensity threshold and a second location of a second region of the second image data where the determined intensity of light exceeds the intensity threshold, the first region and the second region being associated with identifying features of the planar object represented in the first and second image data;
    determining a difference in appearance of the first region and the second region;
    based at least in part upon the orientation of the planar surface of the planar object, the first location, the second location and the difference in appearance, determining a direction of a light source, with respect to the computing device; and
    based at least in part upon the determined direction of the light source, displaying, on a display screen of the computing device at least one instruction for changing an orientation of the computing device, relative to the determined direction of the light source, to cause an intensity of light to fall below the intensity threshold.

2. The computer-implemented method of claim 1, further comprising:
    changing the orientation of the computing device;
    capturing at least one subsequent image; and
    providing the at least one subsequent image to at least one object recognition algorithm configured to provide information about the planar object.

3. The computer-implemented method of claim 1, wherein the at least one instruction for changing an orientation includes at least one of text instructions for adjusting the direction or a directional icon associated with a direction for adjusting the direction of the computing device, the method further comprising updating the at least one instruction based at least in part on detected movement of the computing device at least until the computing device is in a location where the intensity of light falls below the intensity threshold.

4. The computer-implemented method of claim 1, wherein the first image data and the second image data are frames of video, and wherein determining the direction of the light source is further based at least in part upon movement of the first region and the second region as detected between different frames of video.

5. A computer-implemented method comprising:
    generating first image data representing a planar object using a first camera of a computing device;
    generating second image data representing the planar object using a second camera of the computing device, the first camera being separated from the second camera by a distance;
    generating a stereo image pair using at least the first image data and the second image data;
    determining an orientation of a planar surface of the planar object, based at least on the first image data and the second image data in the stereo image pair;
    detecting a location of a region in the first image data where intensity values exceed an intensity threshold, the region being associated with identifying features of the planar object in the first image data;
    determining, based at least in part upon the orientation of the planar surface of the planar object and the location of the region with respect to the first image data, a direction of a light source, with respect to the computing device, that caused a specular reflection from the planar object;
    determining, based at least in part upon the direction of the light source, a first movement of the computing device relative to the direction of the light source, wherein the first movement causes the intensity values in the region associated with the identifying features of the planar object in the first image data to fall below the intensity threshold; and
    providing information about the first movement via the computing device.

6. The computer-implemented method of claim 5, further comprising:

detecting motion of the computing device using at least one sensor of the computing device;
capturing additional image data in response to detecting the motion;
determining an intensity of light in the region associated with the identifying features of the planar object in the additional image data falls below the intensity threshold; and
providing the additional image data for processing.

7. The computer-implemented method of claim 6, further comprising processing the additional image data using at least one of an object detection algorithm, an image matching algorithm, a facial recognition algorithm, a symbol reading algorithm, or an optical character recognition (OCR) algorithm.

8. The computer-implemented method of claim 6, further comprising detecting the motion by analyzing the additional image data, or by using at least one of an accelerometer, an electronic gyroscope, an electronic compass, or an inertial sensor.

9. The computer-implemented method of claim 5, further comprising:
detecting motion of the computing device using at least one sensor of the computing device;
capturing additional image data in response to detecting the motion;
determining an intensity of light in the region associated with the identifying features of the planar object in the additional image data remains above the intensity threshold; and
providing updated information indicating additional movements of the computing device.

10. The computer-implemented method of claim 5, further comprising:
generating additional image data representing the planar object when the first camera is at a different location;
determining a location of the first camera when generating the additional image data;
determining a location of the region associated with the identifying features of the planar object in the additional image data; and
determining the direction of the light source based at least in part upon the location of the region associated with the identifying features of the planar object in the additional image data and the location of the first camera when generating the additional image data.

11. The computer-implemented method of claim 10, further comprising:
generating additional image data from a plurality of additional images captured over a period of time;
determining a change in location of the region associated with the identifying features of the planar object in the additional image data; and
determining the direction of the light source based at least in part upon the change in location of the region between the plurality of additional images.

12. The computer-implemented method of claim 5, further comprising:
determining a location of the region associated with the identifying features of the planar object in the second image data; and
determining the direction of the light source based at least in part upon the location of the region associated with the identifying features of the planar object in the second image data.

13. The computer-implemented method of claim 5, further comprising:
detecting the location of the region associated with identifying features of the planar object in the first image data by locating pixel values that exceed an allowable pixel value.

14. The computer-implemented method of claim 5, further comprising:
providing a notification when the first image data meets at least one processing criterion.

15. A computing device, comprising:
a processor;
a first camera;
a second camera separated from the first camera by a distance; and
a memory device including instructions that, when executed by the processor, cause the computing device to:
generate first image data representing a planar object using the first camera of the computing device;
generate second image data representing the planar object using the second camera of the computing device;
generate a stereo image pair using at least the first image data and the second image data;
determine an orientation of a planar surface of the planar object, based at least on the first image data and the second image data in the stereo image pair;
detect a location of a region in the first image data where intensity values exceed an intensity threshold, the region being associated with identifying features of the planar object in the first image data;
determine, based at least in part upon the orientation of the planar surface of the planar object and the location of the region with respect to the first image data, a direction of a light source, with respect to the computing device, that caused a specular reflection from the planar object;
determine, based at least in part upon the direction of the light source, a first movement of the computing device relative to the direction of the light source, wherein the first movement causes the intensity values in the region associated with the identifying features of the planar object in the first image data to fall below the intensity threshold; and
provide information about the first movement via the computing device.

16. The computing device of claim 15, wherein the instructions when executed further cause the computing device to:
detect motion of the computing device using at least one sensor of the computing device;
capture additional image data in response to detecting the motion;
determine an intensity of light in the region associated with the identifying features of the planar object in the additional image data falls below the intensity threshold; and
provide the additional image data for processing.

17. The computing device of claim 15, wherein the instructions when executed further cause the computing device to:
detect motion of the computing device using at least one sensor of the computing device;
capture additional image data in response to detecting the motion;

determine an intensity of light in the region associated with the identifying features of the planar object in the additional image data remains above the intensity threshold; and provide updated information indicating additional movements of the computing device.

18. The computing device of claim 15, wherein the instructions when executed further cause the computing device to:

generate additional image data representing the planar object when the first camera is at a different location;

determine a location of the first camera when generating the additional image data;

determine a location of the region associated with the identifying features of the planar object in the additional image data; and determine the direction of the light source based at least in part upon the location of the region associated with the identifying features of the planar object in the additional image data and the location of the first camera when generating the additional image data.

19. The computing device of claim 18, wherein the instructions when executed further cause the computing device to:

generate additional image data from a plurality of additional images captured over a period of time;

determine a change in location of the region associated with the identifying features of the planar object in the additional image data; and determine the direction of the light source based at least in part upon the change in location of the region between the plurality of additional images.

20. The computing device of claim 15, wherein the instructions when executed further cause the computing device to:

determine a location of the region associated with the identifying features of the planar object in the second image data; and determine the direction of the light source based at least in part upon the location of the region associated with the identifying features of the planar object in the second image data.

21. A non-transitory computer-readable storage medium including instructions that, when executed by a processor of a computing device, cause the computing device to:

generate first image data representing a planar object using a first camera of the computing device;

generate second image data representing the planar object using a second camera of the computing device, the first camera being separated from the second camera by a distance;

generate a stereo image pair using at least the first image data and the second image data;

determine an orientation of a planar surface of the planar object, based at least on the first image data and the second image data in the stereo image pair;

detect a location of a region in the first image data where intensity values exceed an intensity threshold, the region being associated with identifying features of the planar object in the first image data;

determine, based at least in part upon the orientation of the planar surface of the planar object and the location of the region with respect to the first image data, a direction of a light source, with respect to the computing device, that caused a specular reflection from the planar object;

determine, based at least in part upon the direction of the light source, a first movement of the computing device relative to the direction of the light source, wherein the first movement causes the intensity values in the region associated with the identifying features of the planar object in the first image data to fall below the intensity threshold; and provide information about the first movement via the computing device.

22. The non-transitory computer-readable storage medium of claim 21, wherein the instructions when executed further cause the computing device to:

generate additional image data representing the planar object when the computing device is at a different location;

determine a location of the computing device when generating the additional image data;

determine a location of the region associated with the identifying features of the planar object in the additional image data; and determine the direction of the light source based at least in part upon the location of the region associated with the identifying features of the planar object in the additional image data and the location of the computing device when generating the additional image data.

23. The non-transitory computer-readable storage medium of claim 22, wherein the instructions when executed further cause the computing device to:

generate additional image data from a plurality of additional images captured over a period of time;

determine a change in location of the region associated with the identifying features of the planar object in the additional image data; and determine the direction of the light source based at least in part upon the change in location of the region between the plurality of additional images.

24. The non-transitory computer-readable storage medium of claim 21, wherein the instructions when executed further cause the computing device to:

determine a location of the region associated with the identifying features of the planar object in the second image data; and determine the direction of the light source based at least in part upon the location of the region associated with the identifying features of the planar object in the second image data.

* * * * *